Sept. 13, 1966     H. HURWITZ, JR     3,273,146
OBJECT IDENTIFYING APPARATUS
Filed Aug. 7, 1964     2 Sheets-Sheet 2
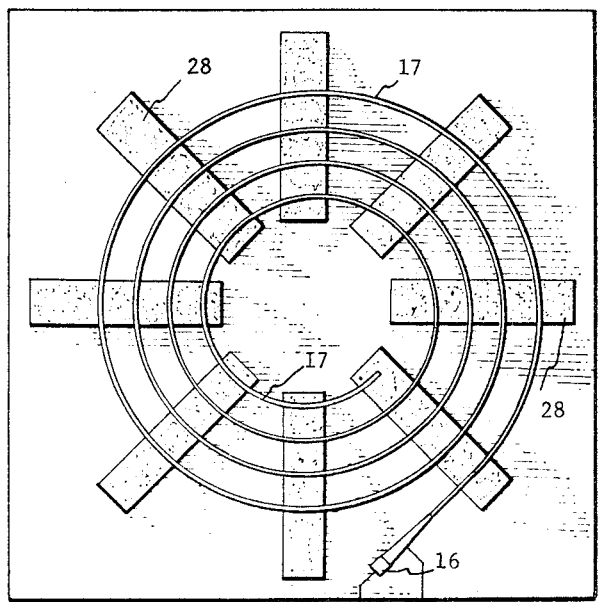
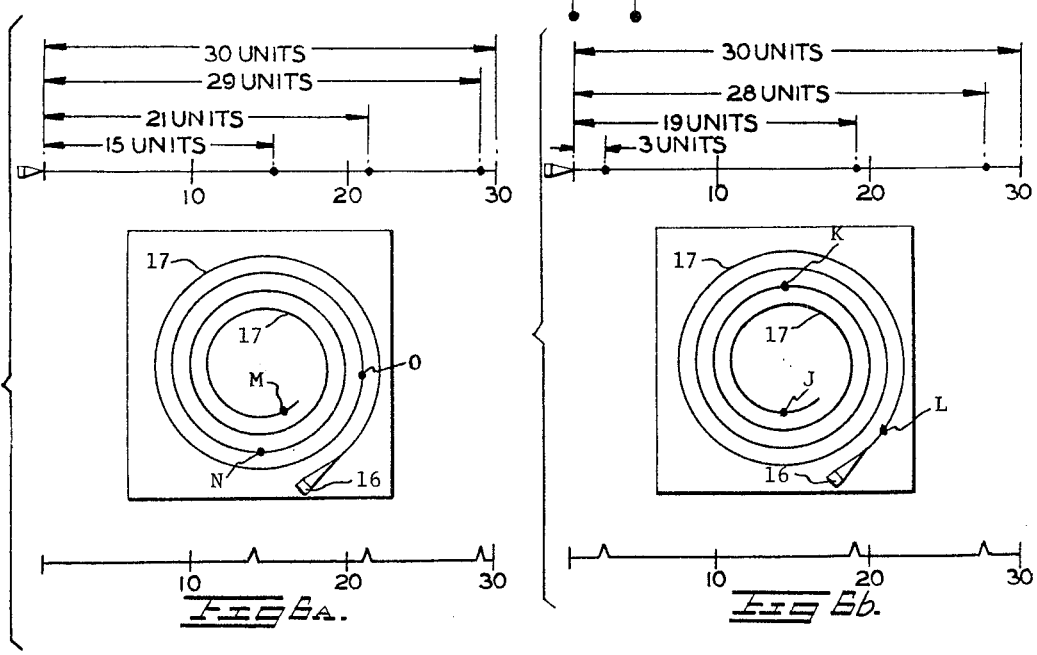

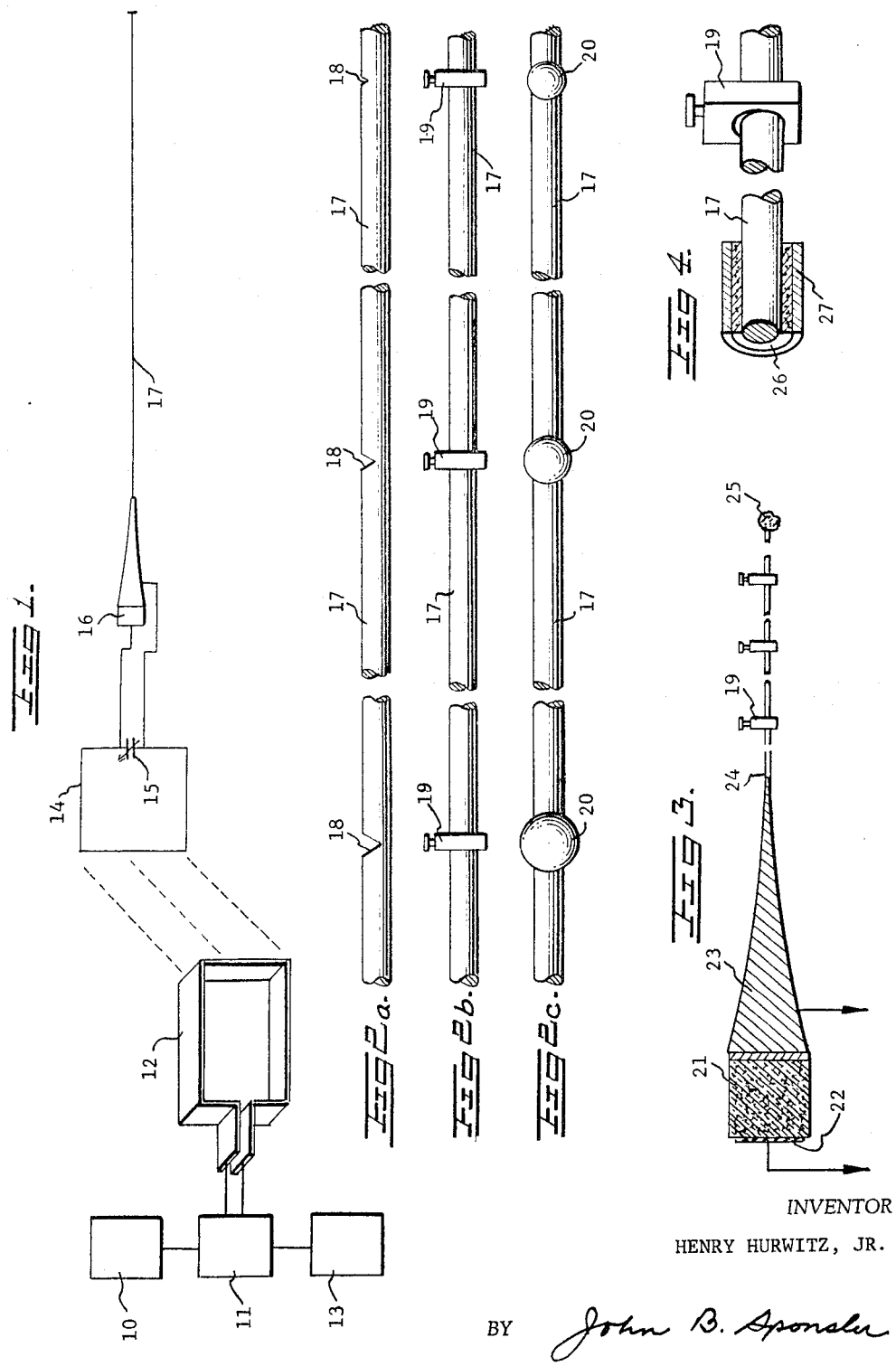

United States Patent Office 3,273,146
Patented Sept. 13, 1966

3,273,146
OBJECT IDENTIFYING APPARATUS
Henry Hurwitz, Jr., Schenectady, N.Y., assignor to General Electric Company, a corporation of New York
Filed Aug. 7, 1964, Ser. No. 388,243
5 Claims. (Cl. 343—6.8)

This invention relates to apparatus for identifying objects, particularly objects which are in movement, by transmitting an interrogation signal to an object to be identified wherefrom energy is reflected indicatory of the object's identification. More particularly the invention is concerned with object identifying apparatus wherein both electromagnetic and acoustical means are employed to expand the capacity of such apparatus.

The present invention is specifically directed to apparatus similar to that disclosed and claimed in copending application Serial Number 266,403 filed Mar. 19, 1963, now Patent No. 3,169,242, wherein a system is set forth having a signal transmitting device operating at radio frequencies, a corresponding and cooperating receiving device, a selective signal repeating device carried by an object to be identified, and logic means for correlating the identification of the object with the signal that is transmitted. In the aforesaid application the signal repeating device includes a plurality of piezoelectric elements, each having a different preselected frequency of response, whereas in the present invention the signal repeating device includes one or more such elements, each of which is associated with an acoustic accessory having further identifying capabilites. In other words the present invention includes not only radio frequency responsive elements, but also means for converting pulses at these frequencies into pulse trains having time spacings which provide further identification capabilities and expand the normal capacity of an object identifying apparatus.

It is, therefore, an object of this invention to provide, an object identifying apparatus wherein radio frequency responsive means is implemented with acoustical pulse trains in combination to identify objects to which interrogation signals are transmitted.

A further object of the invention is to provide an object identifying apparatus where identification of the object is responsive to the time spacing of pulse trains modulating a radio frequency signal.

In its simplest form the present invention includes a radio frequency transmitter capable of generating pulses of short duration and high repetitive rate which excite a stationary loop antenna. Energy is coupled electromagnetically from this stationary loop antenna to another loop antenna carried by the object to be identified. The loop antenna of each object is arranged to carry energy to a piezoelectric transponder having a frequency response within the range of the transmitted frequency, and each transducer is mechanically coupled to a sonic transmission line in the form of a notched wire.

The notched wire is arranged so that the notches are spaced at suitable intervals along its length, each notch reflecting a portion of the acoustical energy received from the transducer back into it. Consequently, the energy reflected back to the transducer is representative of the energy received by the transducer modulated by the sonic delay line according to the locations of the notches of the particular notched wire involved. The energy reflected to the transducer is reconverted to electric energy which is coupled from the loop antenna on the object to be identified to a stationary receiving loop antenna. This energy, which is in the form of pulses reflected by the individual notches, is detected in a receiver and passed to an analyzer which converts pulse information into the desired form for display or recording.

It is still another object of this invention, therefore, to provide an object identifying apparatus wherein a single piezoelectric element is capable of many different time responses to a pulse of radio frequency energy as a result of modulation by a sonic delay line.

A feature of the invention, therefore, is that each piezoelectric element has greater identification capabilities in an object identifying system constructed in accordance with the present invention since each element is capable of being coded into many different time responses via sonic line modulation.

The invention is set forth with particularity in the appended claims. The principles and characteristics of the invention, as well as other objects and advantages are revealed and discussed through the medium of the illustrative embodiments appearing in the specification and drawings which follow.

In the drawings:

FIGURE 1 is a diagrammatic view of an object identifying system according to the teaching of the invention.

FIGURE 2a illustrates one manner in which a wire or rod many be notched to provide a coded sonic delay line.

FIGURE 2b illustrates an equivalent to the notched sonic line of FIGURE 2a utilizing clamps in lieu of notches.

FIGURE 2c is a still further illustration showing an equivalent to the notched arrangement of the sonic line of FIGURE 2a utilizing beads for coding.

FIGURE 3 is a sectional view of a piezoelectric transducer element and its mechanical connection to a sonic delay line.

FIGURE 4 is a further sectional view of a transducer element illustrating a different manner of coupling a sonic delay line.

FIGURE 5 shows diagrammatically the manner in which a sonic delay line of considerable length may be arranged to conserve linear space.

FIGURES 6a and 6b illustrate coded sonic delay lines as contemplated by the invention, together with interpretations of their respective codings.

Referring now to FIGURE 1, a radio frequency transmitter 10 is coupled through an amplifier 11 to an antenna 12, a radio frequency receiver 13 being also coupled to the antenna 12 via the amplifier 11. Seperate transmitting and receiving antennas, each coupled to its respective transmitter or receiver may also be used. A moving object such as a railroad car is provided with an antenna 14 tuned by a capacitor 15 and coupled to a piezoelectric element 16, the resonant frequency of the combined circuit corresponding to one of the frequencies being transmitted. Coupled to the element 16 mechanically is a sonic delay line 17, which may take the form of a notched wire or rod as in FIGURE 2a, the notches 18 being of depths varying inversely with their distance along the wire or rod from the piezoelectric element 16.

For example, the transmitter 10 may consist of a radio frequency generator of pulses of approximately 1 kilowatt at 450 kilocycles with 10 microsecond duration and a repetition rate of 100 per second. The radio frequency energy from the transmitter 10 via the amplifier 11 and the antenna 12 passes inductively to the antenna 14 when the moving object, or railroad car for example, is within range thereby energizing the piezoelectric element 16, which acts as a transducer in respect to the notched wire or rod 17 so that the radio frequency energy is converted into sonic energy. The circuit between the antenna 14 and the piezoelectric element 16 preferably has such a loaded Q as to provide effective coupling without serious pulse elongation and may have, for example, a loaded Q of approximately 20.

The wire or rod 17, for example, may be 2.5 meters in length and 1 millimeter in diameter being notched at suitable intervals along its length according to a predetermined coding, each notch reflecting approximately .1% of the acoustical energy incident upon it back to the piezoelectric element. Consequently, a 10 microsecond pulse of the 450 kilocycle oscillation will cause a series of acoustical pulses of approximately 10 microsecond duration to be reflected back into the element 16. If the minimum distance between the notches in the wire or rod 17 is approximately 7 centimeters, the minimum spacing of the echo pulses will approach 30 microseconds thereby permitting accurate discrimination, a 2.5 meter wire or rod, for example, permitting a 30 digit binary number to be coded using notches at each 7 centimeter location along the length of the sonic medium 17.

Since each notch in the wire 17 is designed to reflect approximately .1% of the power, the attenuation of the main wave is very small, and the amplitude of the various pulses will be approximately the same. Reflected pulses returning to the piezoelectric element 16 are converted back into radio frequency energy by the piezoelectric effect, these being fed into the loop antenna 12 via its coupling with antenna 14 and ultimately picked up by the receiver 13 through amplifier 11. Translation of the received signals in the receiver 13 is accomplished in a manner similar to that described in the copending application referred to above.

In apparatus of this kind the signal to noise ratio is quite favorable. It is assumed that a 20 decibel attenuation occurs between the antenna 12 and the piezoelectric element 16, a 10 decibel attenuation from the element 16 into the sonic line 17, a 30 decibel attenuation on reflection, a 10 decibel attenuation in converting the reflected acoustical pulse into radio frequency power, and a 20 decibel attenuation between the antenna 14 and the receiver 13; consequently, the overall attenuation is 90 decibels so that the input signal to the receiver 13 may be $10^{-6}$ watts and well within detectable signal range.

The sonic line 17 may be constructed in various ways as illustrated in FIGURES 2a, 2b and 2c. FIGURE 2b utilizes clamps 19 at the coding locations in lieu of notches, these clamps having an additional advantage in that the coding of a particular sonic line might be altered merely by loosening and re-positioning the clamps at the new coding positions. FIGURE 2c illustrates another manner in which a sonic line may be coded using beads attached to or otherwise mounted upon the wire or rod 17, the sizes of the beads reducing as the distance from the element 16 along the wire 17 increases.

Although the element 16 may be provided in many other ways normally it is constructed as in FIGURE 3 wherein a piezoelectric crystal 21 is clamped or bonded between a plate 22 and the butt 23 of a conical member terminating in a connection 24 with the sonic line 17. As shown in FIGURE 3 the sonic line is provided with clamps 19 (as in FIGURE 2b), the extremity of the wire 17 being provided with a damper 25 consisting of a ball of rubber or other mechanical absorbing material, the object of the damper being to prevent spurious reflections as a result of the termination of the wire 17. Electrical connections to the piezoelectric transducer of FIGURE 3 are made to the plate 22 and to the butt 23.

Molded cylindrical ceramic elements having piezoelectric properties may be attached directly to the sonic line 17 as illustrated in FIGURE 4, the aforesaid element being shown as a hollow cylinder 26 covering circumferentially the wire 17, a metallic cylinder 27 surrounding the cylinder 26. Electrical connections in this arrangement are to the wire 17 and to the metallic cylinder 27, and although the coding is shown as being the clamp type (see clamp 19) any of the other forms of coding the sonic line are equally applicable.

As has been previously pointed out apparatus following the teaching of the present invention has the advantage of increasing the number of objects that may be included in a single system for identification in view of the coded sonic line coupled to each of the piezoelectric elements, which are necessarily limited in frequency range within the operating wavebands available. Theoretically a system according to the present invention has an unlimited number of coded combinations available so that any number of objects to be identified can be included in one system. On the other hand physical dimensions in the lengths of sonic lines carried by the objects to be identified provides another limitation. FIGURE 5 illustrates a manner in which a sonic line 17 provided with a piezoelectric element 16 may be formed into a spiral configuration for conserving space, the turns of the spiral being positioned upon or between acoustic insulators 28, the latter being composed of foam rubber or a material having similar properties.

FIGURES 6a and 6b illustrate the manner in which coding combinations are applied to sonic spirals. For example, in each spiral of 30 units of length coding may be applied in the form of notches, clamps, beads, etc., at the terminus of each unit, the coding of FIGURE 6a being "15," "21," "29" represented by notches at O, N and M and the coding of FIGURE 6b being "3," "19," "28" represented by notches at L, K and J. The piezoelectric elements 16 connected to the spirals of FIGURES 6a and 6b may be of the same or different response frequencies. Obviously in any one object identification system each sonic coding combination can be repeated for each different piezoelectric response frequency in respect to the elements 16.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as full within the scope and spirit of the invention.

What is claimed is:

1. An object identifying apparatus comprising signal reflecting means including a piezoelectric element and an acoustic delay line having a length of sonic transmitting material with reflecting elements therein at spaced locations corresponding to predetermined coding representative of the identity of said object, said delay line being mutually coupled to said element, means for transmitting signals to said reflecting means, and means for receiving reflected signals for identifying said object.

2. The invention set forth in claim 1 with the further provision that the said reflecting elements are provided by notches cut into the said material.

3. The invention set forth in claim 1 wherein the said reflecting elements comprise clamps attached to the material.

4. The invention according to claim 1 with the further provision that the said reflecting elements are beads affixed to the material.

5. The invention according to claim 1 in which the said length of material is of spiral configuration and is acoustically isolated.

References Cited by the Examiner

UNITED STATES PATENTS

| | | | |
|---|---|---|---|
| 2,582,310 | 1/1952 | Chireix | 343—18 |
| 2,943,318 | 6/1960 | Deloraine et al. | 343—6.8 X |
| 2,978,699 | 4/1961 | Dodington | 343—6.8 X |

OTHER REFERENCES

Barber: "21 Ways to Pick Data Off Moving Objects," Control Engineering, vol. 11, No. 1, January 1964, pp. 61–64 relied upon.

CHESTER L. JUSTUS, *Primary Examiner.*

P. M. HINDERSTEIN, *Assistant Examiner.*